United States Patent
Nako

[11] Patent Number: 5,940,544
[45] Date of Patent: Aug. 17, 1999

[54] APPARATUS FOR CORRECTING SKEW, DISTORTION AND LUMINANCE WHEN IMAGING BOOKS AND THE LIKE

[75] Inventor: Kazuyuki Nako, Tenri, Japan

[73] Assignee: Sharp Kabushiki Kaisha, Osaka, Japan

[21] Appl. No.: 08/915,978

[22] Filed: Aug. 21, 1997

[30] Foreign Application Priority Data

Aug. 23, 1996 [JP] Japan .................................. 8-221943

[51] Int. Cl.$^6$ ..................................................... G06K 9/32
[52] U.S. Cl. ...................... 382/293; 382/275; 382/289; 358/496; 358/497
[58] Field of Search ..................................... 358/490–497, 358/486–488, 474, 429, 456, 458; 382/275, 270, 293, 242, 298–299, 289, 295–297

[56] References Cited

U.S. PATENT DOCUMENTS

| | | | |
|---|---|---|---|
| 5,537,226 | 7/1996 | Wolberg et al. | 358/497 |
| 5,537,494 | 7/1996 | Toh | 382/242 |
| 5,764,383 | 6/1998 | Saund et al. | 358/497 |
| 5,805,272 | 9/1998 | Nozawa et al. | 355/25 |

FOREIGN PATENT DOCUMENTS

| | | | |
|---|---|---|---|
| A 5-161004 | 6/1993 | Japan | H04N 1/40 |
| A 6-164852 | 6/1994 | Japan | H04N 1/04 |
| A 8-181828 | 7/1996 | Japan | H04N 1/04 |

*Primary Examiner*—Leo H. Boudreau
*Assistant Examiner*—Ishrat Sherali
*Attorney, Agent, or Firm*—David G. Conlin; Peter J. Manus

[57] ABSTRACT

An object of the invention is to correct a distortion due to inclination of a document and to correct a luminance.

First, an edge detection section detects an edge of a document image from a picture obtained by imaging the document. Then, a skew detection section detects a skew of the document from the edge. A rotation correction section causes the picture to rotate on the basis of the skew detected by the skew detection section. Subsequently, the edge detection section again extracts a document image edge from the picture rotated by the rotation correction section. Further, a height calculation section calculates from the edge a height of the document. Simultaneously, a magnification calculation section calculates from the edge a magnification of the picture. Next, a distortion correction section corrects a distortion by magnification/reduction of the picture rotated by the rotation correction section on the basis of the document height and the magnification. Lastly, a luminance correction section corrects the luminance of pixels of the distortion-corrected picture. Whereby, even when the document suffers from skew added thereto, distortion correction and luminance correction can be performed.

10 Claims, 12 Drawing Sheets

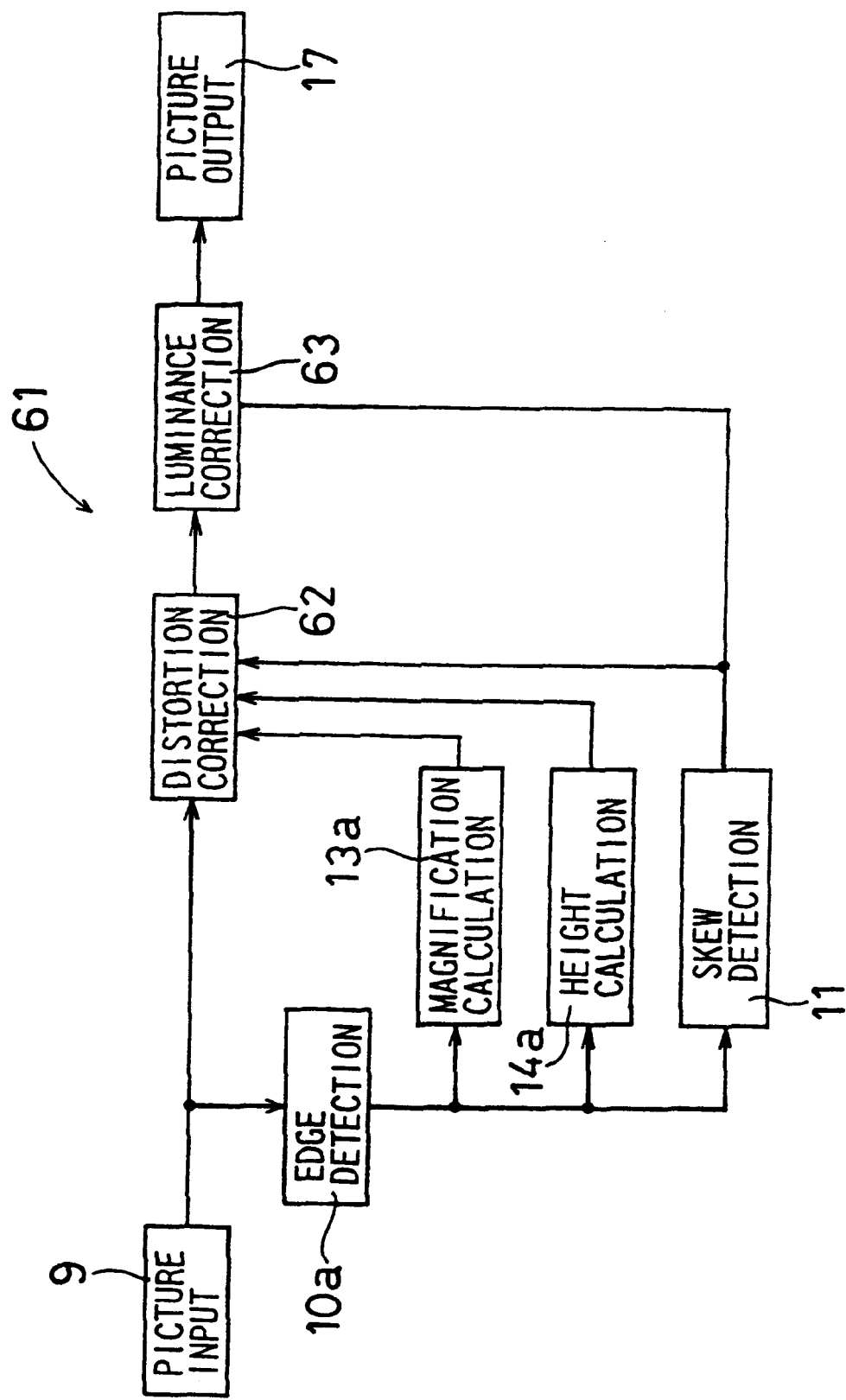

EDGE AFTER CORRECTION

APPARATUS FOR CORRECTING SKEW, DISTORTION AND LUMINANCE WHEN IMAGING BOOKS AND THE LIKE

BACKGROUND OF THE INVENTION

1. Field of the Invention

The present invention relates to a picture processing apparatus, more particularly, to a picture processing apparatus for correcting a picture containing a document image with a spatial curvature, such as books or the like, into a distortion-free picture.

2. Description of the Related Art

As one prior art, picture distortion correction apparatus is disclosed in, for example, Japanese Unexamined Patent Publication JP-A 6-164852(1994), which apparatus is such constituted that a document guide having a black surface is provided at a document table, for detecting the boundary between a document image and a document table image, to calculate a magnification/reduction ratio of the picture on the basis of detection results to correct picture distortion.

Another prior art apparatus is disclosed in Japanese Unexamined Patent Publication JP-A 181828 (1994), which is a picture synthesizer apparatus for correcting picture distortion, wherein a similar stripe is added to the above mentioned document guide so as to enhance document shape recognizability by varying the luminances of such stripe pattern and the surface of the document.

Still another prior art is found in Japanese Unexamined Patent Publication JP-A 5-161004(1993), which is designed to correct picture distortion and luminance variations based on the boundary between a document and a document table.

However, the prior art disclosed in Japanese Unexamined Patent Publication JP-A 6-164852 (1994) is merely drawn to line inclination/curvature correction (correction of expansion distortion in the longitudinal direction of a document) and is silent about correction of distortion due to document inclination and rotation. This prior art is encountered with another problem in that page bundling seam line-included gutter marginal portions of spread pages of a book would act as a shadow area and can thus be printed in black due to lack of luminance correction schemes.

The above described three prior art approaches suffer from a problem which follows: Where a document is placed so as to be inclined or rotated, lower part of the document can no longer be corrected accurately during correction of distortion-enhanced document portions in the vicinity of page bundling seam line of a book because of the fact that these approaches take no account of skew such as document rotation, and designed to perform corrections merely based on an edge from the boundary of a document upper section assuming the document height to be identical in a direction perpendicular to its seam line.

A further problem faced with the prior art is that even where a document to be scanned is disposed along the document guide, document skew usually takes place, which rendering it difficult to successful correct the distortion in the vicinity of a seam line of a book.

SUMMARY OF THE INVENTION

It is an object of the present invention to provide a picture processing apparatus capable of successfully correcting distortion of a skewed document and outputting natural pictures to solve the prescribed problems.

In a first aspect of the invention, a picture processing apparatus comprises:

first edge detection means for detecting an edge of a document image from a picture obtained by imaging the document;

skew detection means for detecting a skew of the document from the edge detected by the first edge detection means;

rotation correction means for rotating the picture on the basis of the skew;

second edge detection means for detecting an edge of the document image from the picture rotated by the rotation correction means;

magnification calculation means for calculating a magnification of the picture from the edge detected by the second edge detection means;

height calculation means for calculating a height of the document from a reference plane on the basis of the edge detected by the second edge detection means; and distortion correction means for correcting a distortion of the picture through magnification/reduction of the picture rotated by the rotation correction means on the basis of the magnification and the height of the document.

In accordance with the first aspect of the invention, the picture processing apparatus is such constituted that the first edge detection means operates to detect an edge from a picture, which are then used in detecting skew in the document for causing the picture to rotate so as to compensate for such skew. Furthermore, the second edge detection means operates to further detect an edge from the rotated picture, which edge is used for calculation of a document height from a reference plane as well as an magnification of the picture. Based on the document height and the magnification of the picture, the rotation-corrected picture is next subjected to magnification/reduction processing. The first edge detection means and the second edge detection means may be attained by the same circuitry.

With such constitution, even where magnification/reduction is performed by calculating the document height and magnification ratio merely based on an edge representative of a boundary of the upper portion of the document as discussed supra in conjunction with the prior art, it becomes possible to accurately correct the lower portion of the document because a skew in a picture to be processed for magnification/reduction has been compensated by the rotational conversion. This in turn enables attainment of reliable correction of any distortion at such portion thus making it possible to obtain a natural picture in which an imaged object resembles to the real shape of the object through the magnification/reduction.

In a second aspect of the invention a picture processing apparatus comprises:

first edge detection means for detecting an edge of a document image from a picture obtained by imaging the document;

skew detection means for detecting a skew of the document from the edge detected by the first edge detection means;

picture reshaping means for reshaping a predetermined region of the picture on the basis of the skew;

second edge detection means for detecting an edge of the document image from the picture reshaped by the picture reshaping means;

magnification calculation means for calculating a magnification of the picture from the edge detected by the second edge detection means;

height calculation means for calculating a height of the document from a reference plane on the basis of the edge detected by the second edge detection means; and distortion correction means for correcting a distortion of the picture through magnification/reduction of the picture reshaped by the picture reshaping means on the basis of the magnification and the height of the document.

In accordance with the second aspect, the picture processing apparatus is such constituted that the first edge detection means operates to detect an edge from a picture, which are then used in detecting skew in the document for causing a predetermined region of the picture to be reshaped so as to compensate for such skew. Preferably, this predetermined region is set to include a portion where the distortion of the picture is large. Then, the second edge detection means is operated to further detect an edge from the reshaped picture, which edge is for use in performing magnification/reduction of the reshaped picture. With such constitution, even when the magnification/reduction is done in a way as stated supra in connection with the prior art, it becomes possible to accurately correct the lower portion of the document because a skew in a picture to be processed for magnification/reduction has been compensated by the reshaping. Accordingly, a natural picture can be obtained after the magnification/reduction for the same reason as the first aspect.

Further, in the picture processing apparatus according to this aspect, the part to be processed for skew compensation in the picture is smaller in area compared to the case of the picture processing apparatus of the first aspect. Accordingly, the processing amount for compensating the skew can be reduced compared to the case where the skew is compensated by rotating the picture as in the first aspect. Accordingly, the processing time for whole picture processing can be shorten.

In a third aspect of the invention a picture processing apparatus comprises:
edge detection means for detecting an edge of an image of a document from a picture obtained by imaging the document;
skew detection means for detecting a skew of the document from the edge;
magnification calculation means for calculating a magnification of the picture from the edge;
height calculation means for calculating a height of the document from a reference plane on the basis of the edge;
distortion correction means for correcting a distortion of the picture by subdividing a predetermined region of the picture into a plurality of trapezoidal segments based on the skew, to individually perform magnification/reduction for each trapezoidal segment on the basis of the skew, magnification, and height of the document.

In accordance with the third aspect of the invention, the picture processing apparatus reshapes a predetermined region of the picture based on the skew of the document, after that, subdivides the predetermined region having been reshaped into a plurality of trapezoidal segments, and performs magnification/reduction for each trapezoidal segments. With this constitution, even in the case of performing magnification/reduction in a way as explained in the prior art, it is possible to obtain a natural picture after magnification/reduction for the same reason in the second aspect. Further, since parameters for magnification/reduction are determined with respect to every trapezoidal segment, it becomes possible to obtain a more natural picture as compared to the picture processing apparatus of the second aspect. Still further, in the picture processing apparatus of this aspect, edge detection is carried out only once. Whereby, the procedure for picture processing is simplified. Accordingly, the processing time for whole picture processing can be much shortened as compared to the picture processing apparatus of first or second aspect.

In a fourth aspect of the invention the picture processing apparatus further comprises luminance correction means for correcting a luminance of the picture whose distortion has been corrected by the distortion correction means, in such a manner that the higher the luminance the closer the luminance comes to a predetermined upper limit.

In accordance with the first or second aspect of the invention, the picture processing apparatus of the first or second aspect further corrects the luminance of pixels in distortion-corrected picture in the manner described supra, after the distortion correction by the distortion correction means. When the picture involves a distortion due to a curvature of the document, such a curved portion can bring a shadow, which would result in reduction of luminance of a picture representative of such portion within the picture, that is, a picture having a distortion. With the picture processing apparatus of the fourth aspect, as has been described previously, it is possible to correct the change in luminance due to the picture distortion by means of luminance correction means. Especially, visibility of the images in the vicinity of page bundling seam line of a book or the like in the picture is improved. This may increase quality of the picture after correction.

In a fifth aspect of the invention the picture processing apparatus further comprises luminance correction means for correcting a luminance of each trapezoidal segment of the picture whose distortion has been corrected by the distortion correction means, in such a manner that the higher the luminance the closer the luminance comes to a predetermined upper limit.

In accordance with the fifth aspect of the invention, the picture processing apparatus further corrects the luminance of pixels of distortion-corrected picture after distortion correction by the distortion correction means in the way mentioned supra. When the picture contains a distortion due to a curvature of the document, luminance of the portion corresponding to such distortion within the picture can decrease for the reason as explained concerning the fourth aspect. Since pixels in the trapezoidal segment form a band-like region elongated in a y-direction on the original document, by using the above process the luminance value can be corrected so that luminance distribution in the corresponding trapezoidal segment is identical with that in the original band-like region. This may improve the visibility of images in the vicinity of the page bundling seam line of a book within a picture. It is thus possible to further improve a quality of corrected picture.

In a sixth aspect of the invention the edge detection means subdivides the picture into a plurality of detection blocks, to detect an edge position of each detection block at a predetermined location, to connect lines each defined by two of the plurality of detected edges position, thereby designating an edge.

In accordance with the sixth aspect of the invention, the edge detection means detects an edge in the way stated supra. At this time, an interval between positions for edge detection is minimal when it is identical to the interval of pixels constituting the picture, and the edge positions result in a discrete progression. With the picture processing apparatus of the invention, since the height and magnification are calculated based on such edge position within the picture, if the edge positions are represented by such discrete values, it will be difficult to correct the picture smoothly. To avoid this, the edge detection means designates the edge in the way discussed supra. As a result of this, edge positions at parts interpolated with a line are represented by continuous values so that smooth correction of picture is realized.

Further, since the interval for detecting the edge position may be actually attainable with a unit of plural pixels despite the edge positions being represented by continuous values, for example, it is possible to reduce in number the positions of edge to be detected as compared to the case where the edge position is directly detected for every pixel. Accordingly, the processing time for edge detection can be shortened. Further, when a line with its both ends corresponding to two edge positions is linear, the processing becomes further simplified enabling a further decrease in processing time.

In a seventh aspect of the invention the edge detection means reduces the detection block in response to increases in variation amount of the edge within the picture.

In accordance with the seventh aspect of the invention, the edge detection means detects an edge position while defining a detection block as described above. At this time, since the detection block decreases with an increase in edge variation amount, the edge positions are detected more precisely when such edge variation amount is large. Hence, when these detected edge positions are connected together by a line, this line much resembles a real edge. Therefore, by way of example, it is possible to detect precisely and smoothly the edge in the vicinity of a bundling seam line of a document such as a book or the like. Consequently, the picture can be appropriately corrected during picture correction processing.

In an eighth aspect of the invention, the picture reshaping means enlarges the predetermined region as the skew becomes larger.

According to the second aspect of the invention, the predetermined region is changed as described previously. Whereby, portions with increased distortion in the picture when the skew is large is larger in area than those when the distortion is large, for example. In this situation, by changing the predetermined region in accordance with to the skew, it becomes possible to reshape minimum part which requires to be reshaped for compensation of the skew. Therefore, it is possible to select an appropriate processing area for reshaping of the picture. Hence, it becomes possible to optimize the processing amount while optimizing the processing time as taken therefor.

In a ninth aspect of the invention the distortion correction means enlarges the predetermined region as the skew becomes larger.

According to the third aspect of the invention, the predetermined region is changed as described previously. Whereby, for the same reason as that of the eighth aspect, it is possible to select a suitable processing area for picture reshaping. Accordingly, it is possible to optimize the processing amount for picture reshaping while optimizing the processing time.

In a tenth aspect of the invention the skew detection means determines a maximal point and a minimal point from among the edges, and detects as a skew an angle between a straight line penetrating such maximal and minimal points and a predetermined reference axis line in the picture.

In accordance with the tenth aspect of the invention, the skew detection means detects skew in the way stated supra. The closer the portion within the picture is to the seam line of a book or the like, the smaller the picture is reduced; this may ensure that a specific straight line passing through the maximal and minimal points in the edge of such portion is predictable as a reference line indicative of the seam line. As a consequence, if this straight line is parallel with the reference axis line then it can be true that no skews are present in the picture; on the contrary, if the two lines intersect each other then skew must exist therein. Hence, it is possible by detecting the angle to detect skew. In addition, such edge maximal/minimal points of edge are easy to detect, which enabling to simplify the skew detection processing.

BRIEF DESCRIPTION OF THE DRAWINGS

Other and further objects, features, and advantages of the invention will be more explicit from the following detailed description taken with reference to the drawings wherein:

FIG. 3 is a diagram representing a picture obtained by the picture input device 9a;

FIG. 15 is a block diagram showing an electrical configuration of a picture synthesis apparatus 61 which is a third embodiment of the invention.

DETAILED DESCRIPTION OF THE PREFERRED EMBODIMENTS

Figure 1:
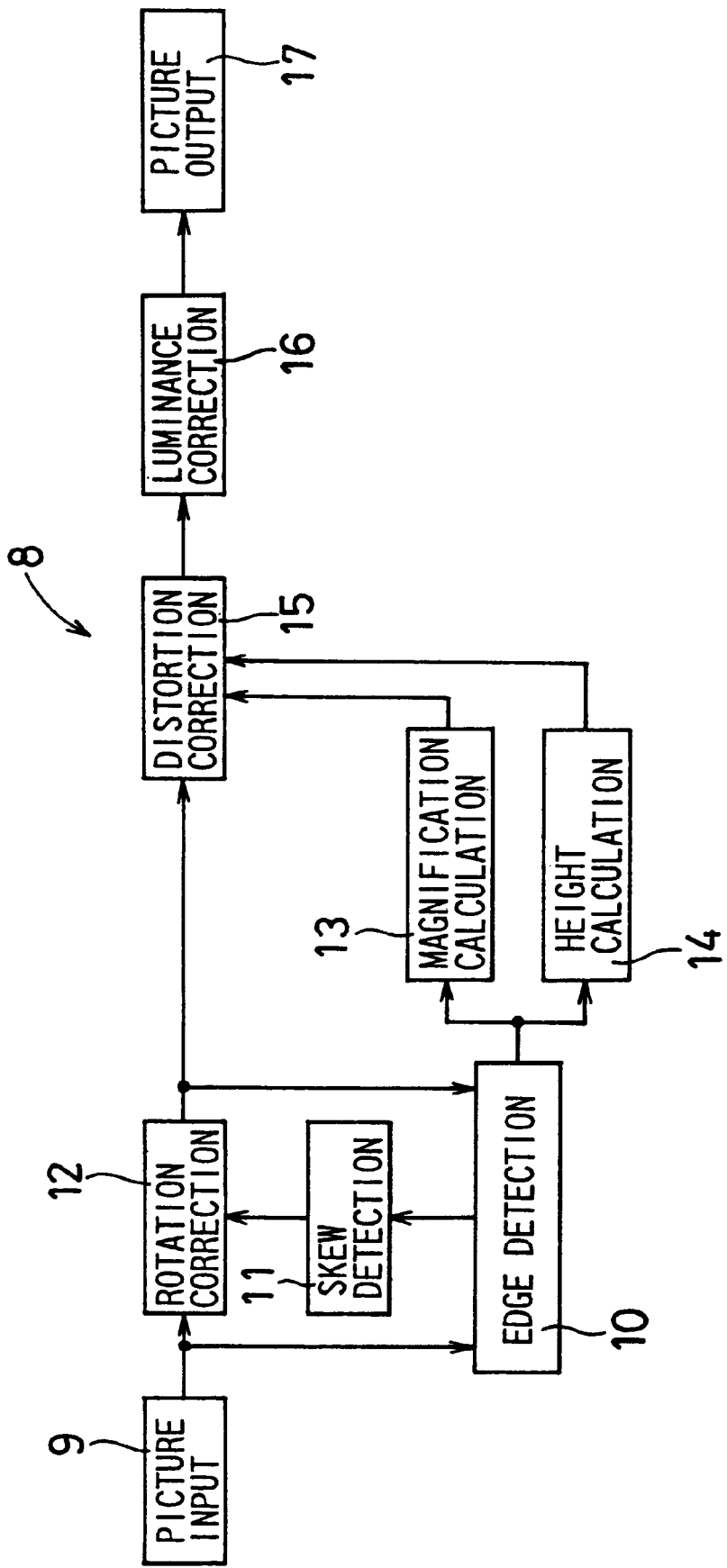
FIG. 1 is a block diagram showing an electrical configuration of a picture synthesis apparatus 8 in accordance with a first embodiment of the invention.

Now referring to the drawings, preferred embodiments of the invention are described below.

FIG. 1 is a block diagram showing an electrical configuration of a picture processing apparatus 8 in accordance with one embodiment of the invention. The picture processing apparatus 8 comprises a picture input device 9, an edge detection section 10, a skew detection section 11, a rotation correction section 12, a magnification calculation section 13, a height calculation section 14, a distortion correction section 15, a luminance correction section 16, and a picture output device 17.

The picture input device 9 reads a document as put on a document table, generates a picture containing a document image, and inputs the picture. This picture is a monochrome picture by way of example, and comprises a plurality of pixels arrayed in a matrix form. The picture is represented by an electrical signal involving data indicative of the luminance of each pixel. The edge detection section 10 detects an edge of the document image from the picture inputted by the picture input device 9. The edge within the picture, for example, corresponds to a boundary of the document and the document table. The skew detection section 11 detects a reference line representative of the page bundling seam line of the book document as well as skew of such reference line on the basis of the edge detected by the edge detection section 10. The rotation detection section 12 makes use of the skew detected by the skew detection section 11 to effectuate rotation correction of the entire picture.

When rotation correction of the picture is done by the rotation correction section 12, the edge detection section 10 detects again an edge of the rotation-correct ed picture. The magnification calculation section 13 calculates a magnification of the picture on the basis of the edge as detected by the edge detection section 10 from the corrected picture. The height calculation section 14 calculates based on the detected edge at the edge detection section 10, a height of the document from the surface the document table of the picture input device 9. The distortion correction section 15 reshapes the picture rotation-corrected by the rotation correction section 12 on the basis of the magnification as calculated by the magnification calculation section 13 as well as the document height calculated by height calculation section 14 to correct the distortion of entire picture. As a result of this, the shape of the document image becomes rectangle. The luminance correction section 16 corrects luminance of the picture as distortion-corrected by the distortion correction section 15. The picture output section 17 outputs the picture whose luminance has been corrected by the luminance correction section 16 to a printer and a display device for visual display.

The respective sections 10 to 16 may be individually realized by circuit components which are designed so as to operate individually. Alternatively, these sections 10 to 16 may be accommodated in a single housing while separating these sections from the picture input device 9 and the picture output device 17, to constitute a correction apparatus for performing picture correction. Still alternatively, since respective sections 10 to 16 of this correction apparatus can be operated by a single operation circuit, the same may be realized by causing a computer having a central processing circuit for performing such operation and a register for storing the calculation results to execute a program for performing the operation.

Figure 2:
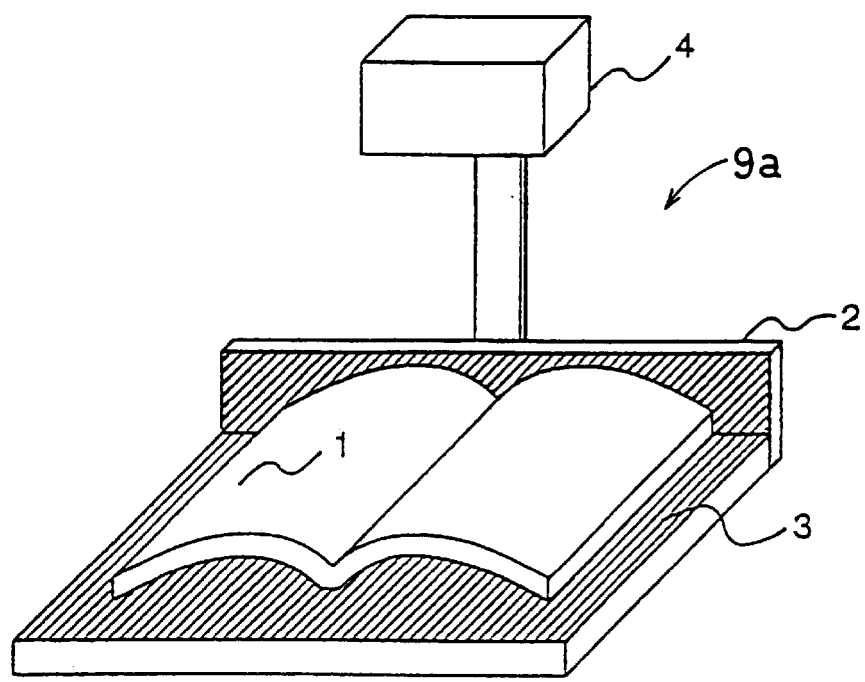
FIG. 2 is a diagram showing a picture input device 9a on which a document is put with its front face directed upwardly.

FIG. 2 is a diagram showing a first example of the picture input device 9. The first exemplary picture input device 9a includes a document table 3, a document guide 2, and a picture imaging section 4. The document table 3 and the document guide 2 are disposed vertically to each other, wherein the surfaces thereof painted in black, which is clearly distinguishable from the background color of the document 1, i.e. white. The picture imaging section 4 is supported over the document table 3, and includes an imaging device such as a CCD image sensor and a lens system interposed between the imaging device and the document table 3. This picture input device 9a reads a document as put on the document table 3 with its pages upside.

The document 1 having a page bundling seam line, such as a book, is laid on the document table 3 with its spread pages of interest being upside while the head of the pages are aligned along the document guide. Under such condition, the document 1 is imaged by the picture imaging section 4. Where the document is a book, it is put on the document table 3 in the way stated supra; therefore, the document per se is curved. At this time, the more the height of the surface of document 1 from the surface of document table 3, the closer the surface of the document 1 to the picture imaging section 4; hence, an image representative of such part of the document 1 is enlarged. The picture imaging section 4 analog/digital-converts a picture signal indicative of such picture causing it to be temporarily stored in a memory and a storage medium. Respective sections 10 to 16 of the picture processing apparatus 8 perform correction processing with respect to the picture represented by the picture signal as will be explained later. Note in this embodiment that since the picture imaging section 4 is fixed relative to the document 1, the entire document can be imaged at a time. Alternatively, when the document 1 is larger in size than a range which the imaging device can capture the document 1 at a single imaging operation, the picture imaging section 4 may be modified to exhibit relative movement with respect to the document 1.

Figure 3:
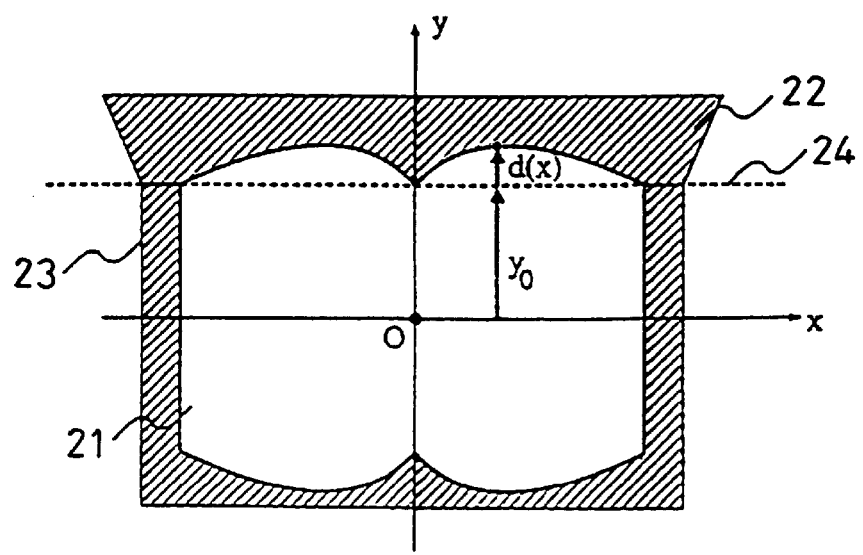

FIG. 3 is a diagram showing a picture which is stored in the memory by analog/digital-converting the picture signal as obtained by causing the picture imaging section 4 to image the document. This picture includes a document image 21 representative of the document 1, a document-table image 23 representing part of the surface of the document table 3 which part is not hidden behind the document 1, and a document guide image 22 representing part of the surface of the document guide 3 which part is not hidden behind the document 1.

While the document 1 is a rectangular paper, the document image 21 is partly distorted for the reason described above, and is not a rectangle. In the document image 21, a portion in the vicinity of the bundling seam line of the document 1 is imaged at less magnification compared to right and left edge portions of the document; portions adjacent to the portion in the vicinity of the seam line are imaged at greater magnification compared to the right and left edge portions of the document 1. Therefore, the portion in the vicinity of the seam line is imaged in reduced size whereas the portions adjacent to the portion in the vicinity of the seam-line are imaged in magnified size. The document table image 23 is a black image with a rectangular peripheral shape, which contains the document image 21 as overlaid thereon. The document guide image 22 is of a trapezoidal outer shape, and has one side neighboring the document table image 23 with the document image 21 being overlapped with part of such side.

In this picture is set an x-y coordinate system having an origin of the center of the picture. The x-y coordinate system is a coordinate system for representation of the positions of pixels of the picture.

Edges of the document image 21 are boundary lines between the document image 21 and the document table image 23, and between the guide image 22 and the document image 21. Of these edges, a straight line which passes through the right and left upper corners of the document image 21 and which is parallel to the x-coordinate axis becomes a base line 24. This base line 24 overlaps the boundary line between the document table image 23 and the document guide image 22. An edge is represented by a sum of a distance $y_0$ between the x-coordinate axis and the base line 24 and a displacement d(x) from the base line 24 to the edge. Additionally, any numerical values as designated by Z(x) (herein, Z is an arbitrary character) in the description are variables which vary with a change in x-coordinate axis value when determination of that value.

Figure 4:
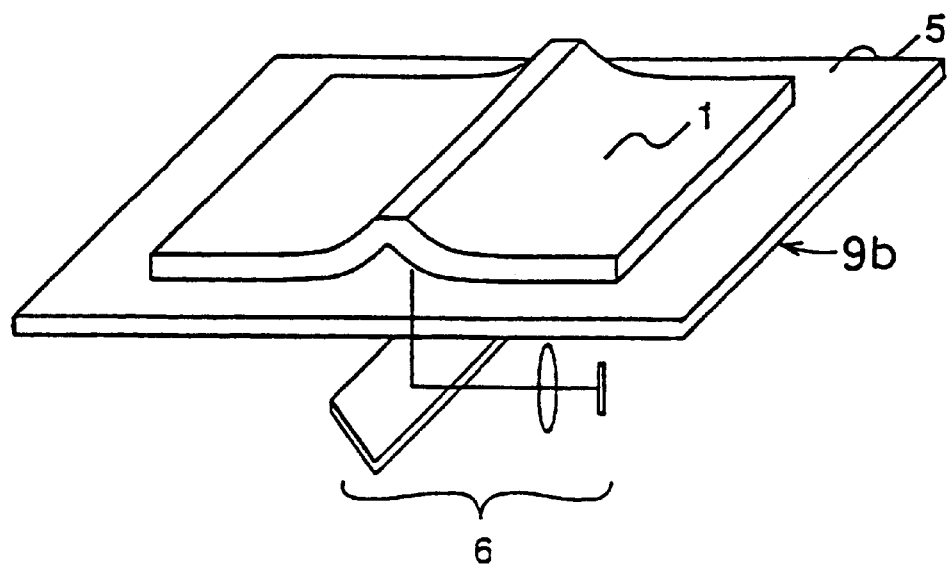
FIG. 4 is a diagram representing a picture input device 9b on which a document is put with its front face directed downwardly.

FIG. 4 is a diagram showing a second example of the picture input device 9. The second exemplary picture input device 9b includes a glass plate 5 acting as a document table, and a picture imaging section 6. This picture imaging section 6 is positioned beneath the glass plate 5, and includes an imaging device such as a line sensor, and a lens system as interposed between the imaging device and the document table 3. The picture input device 9b is the device which reads a document as put on the top surface of the glass plate 5 downwardly, and which is realized by a flat-bed scanner and a reader section of copying machine.

The document 1 is mounted on the top surface of the glass plate 5 with its spread pages placed downwardly. Under this condition, the picture imaging section 6 images the document 1 by sequentially scanning the downward surface of the document 1 while moving the lens and the imaging device. Alternatively, the document may be imaged by only moving the imaging device with the lens being fixed and by sequentially scanning the downward surface of the document. To render distinguishable the edges of the document image 21 in a picture, a lid which covers the glass plate with document 1 laid therebetween during imaging is painted in black on its surface, by way of example. The same may also be attainable by causing the lid to remain opened during imaging of the document 1. When the document is a book, the book-bundling seam line portion will float up from the top surface of the glass plate 5 when it is mounted on the top surface of glass plate 5 as described above. Since such floating portion goes far from the picture imaging section 6, such portion of the document is imaged in reduced size. The image signal processing of the picture imaging section 6 after imaging of the document 1 is the same as that of the picture imaging section 4.

Figure 5:
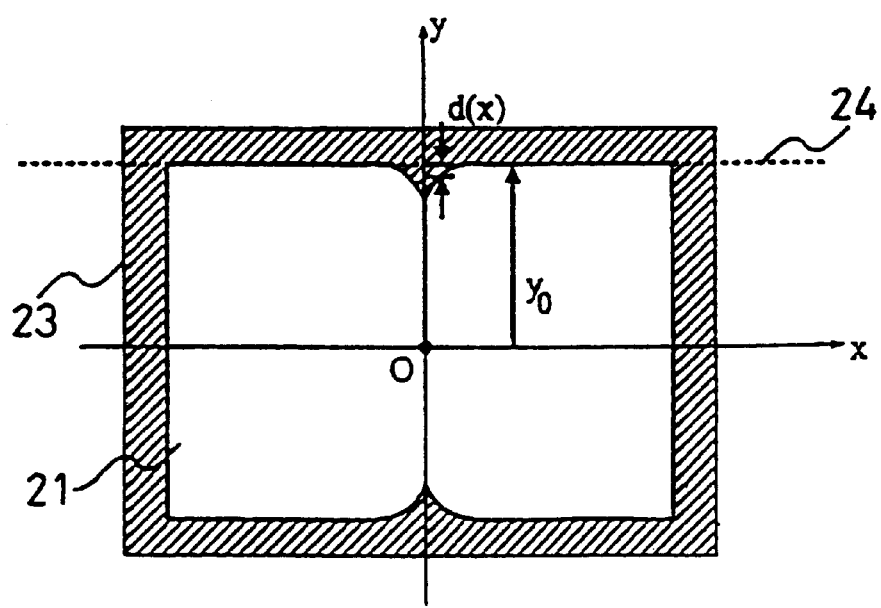
FIG. 5 is a diagram representing a picture obtained by the picture input device 9b.

FIG. 5 is a diagram showing a picture obtained by imaging the document 1 at the picture imaging section 6. This picture contains the document image 21 and the document table image 23. Though the document 1 is a rectangular paper, the document image 21 is partially distorted because the portion corresponding to the seam line of document 1 is reduced for the reason stated previously, and thus is not a rectangle. The document table image 23 is a black image with a rectangular outer shape, within the inside of which the document image 21 is overlaid. A straight line including a boundary line between the document image 21 and the document table image 23 becomes the base line 24 of the picture. In this picture, the x-y coordinate system is set in a manner similar to that of the picture of FIG. 3. An edge as obtained from the document image 21 in a way as will be described later is represented by a difference between the distance $y_0$ from x-coordinate axis to the base line 24 and a displacement d(x) between base line 24 and the edge.

A picture correction operation performed by the respective sections 10–16 will now be explained in detail in conjunction with the exemplary picture of FIG. 3.

Figure 6:
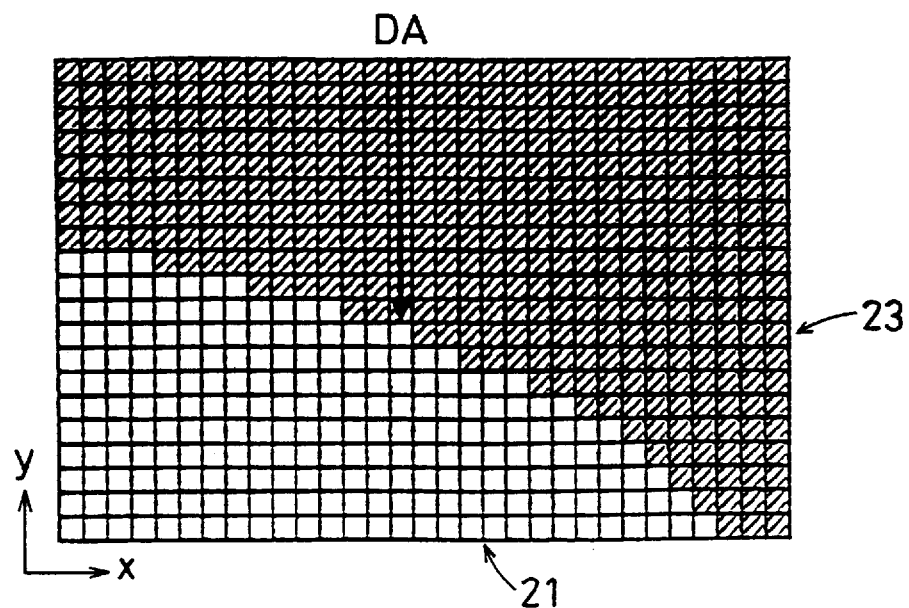
FIG. 6 is an enlarged view of part of the picture of FIG. 3 in the vicinity of a boundary between a document image 21 and a document table image 23, for explanation of edge detection.
Figure 7:
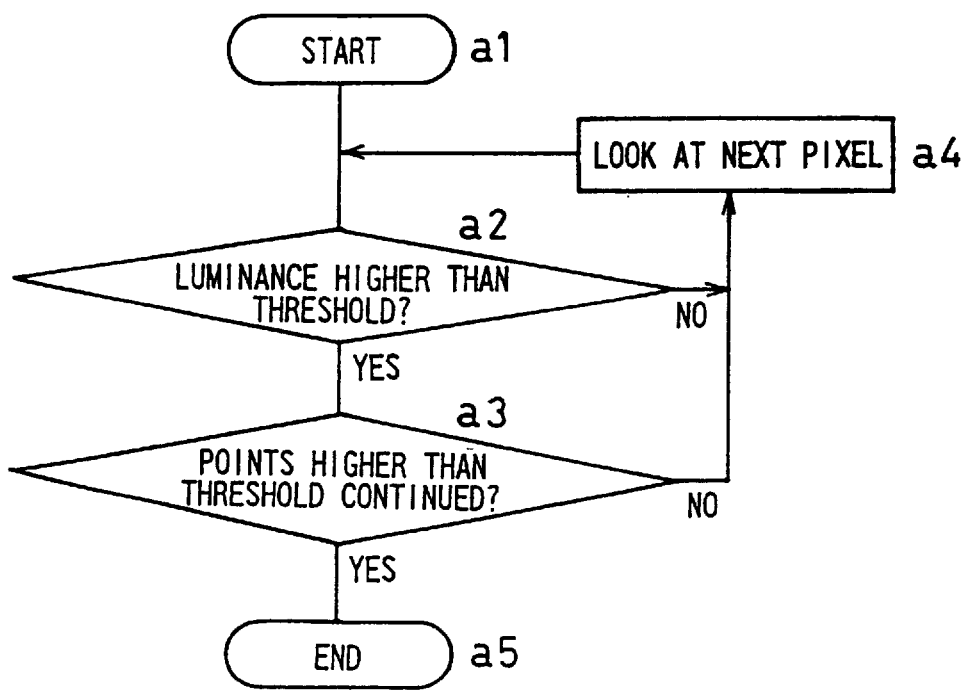
FIG. 7 is a flow chart for explanation of edge detection.

An edge detection operation of the edge detection section 10 will first be explained in detail as follows. FIG. 6 is an enlarged depiction of part of the picture of FIG. 3, which part is in the vicinity of the boundary between the document image 21 and the document table image 23. In FIG. 6, individual rectangular regions represent pixels of the picture, wherein some with hatching are black pixels whereas those with no hatching are white pixels. FIG. 7 is a flow chart for explanation of the edge detection operation of the edge detection section 10. In this flow chart, the judgment criterion of step a2 is the one for use in the case where the document image 21 is a white image whereas the document table image 23 is a black image.

Upon start-up of the edge detection section 10, the procedure goes from step alto step a2. At step a2, first, search for pixels DA outside the document image 21 within the picture to determine whether the luminance value of such pixels is greater than a predetermined threshold value. If the luminance value is less than the predetermined threshold value, it may be considered that such pixels are those within the document table image 23. At this time, the process goes back from step a2 to step a4 which changes the target pixel to a pixel as shifted by one pixel in the y-direction from the pixel DA; then, with respect to the changed pixel, perform judgment of step a2. When the luminance value of certain pixel is judged to be less than the predetermined value, and then the luminance value of a pixel neighboring the certain pixel is judged to greater than the predetermined value, it may be considered that the neighboring pixel is the pixel on an edge. At this time the process goes from step a2 to step a3.

At step a3, the number of continuous pixels which have been extracted from the first determined pixel with a luminance value as judged to be greater than the threshold value at step a2 is counted to judge whether the number of pixels which have continuously obtained is equal to or greater than a predetermined value. This is the judgment criteria for elimination of any possible adverse influence of optical noises during imaging operation as well as electrical noises during picture processing at sections 10 to 16 of FIG. 1; when only a few pixels are continued from the first pixel, predict this first pixel not as the one on the edge. If this is the case, the process returns from step a3 to step a4, change the target pixel, and repeat steps a2 and a3. Whereby, in cases where pixels with luminance values less than the threshold value due to the above noises are present in regions other than the document image 21, any erroneous determination of such pixels as the on-the-edge ones can be eliminated.

When it is judged at step a3 that a sequence of the pixels which are greater in number than the predetermined value were obtained continuously from the first pixel, suppose that the first pixel is one of the on-the-edge pixels. At this time, the process goes from step a3 to step a5, completing edge detection. A similar edge detection process will be repeated for plural times while shifting the first target pixel in the x-direction. Whereby, a plurality of first pixels are obtained so that the edge detection section 10 finally output a train of position coordinate points each consisting of the position coordinates of its first pixel, as edge data representative of an edge position within the picture.

In the case of judging the pixels on each edge using the threshold value in the way as described above, the edge data might be of discrete values because the edge position in the picture can be detected only for the position of pixels. Since the picture processing apparatus of this embodiment is arranged to calculate the height and magnification based on the edge position in the picture, this embodiment is associated with a problem that when the edge data is represented by such discrete values, it is unable to smoothly correct the picture. Then, to detect the edge, set the first "target" pixels DA in a way such that an appropriate number of pixels are selected from among those aligned in the x-direction at specific intervals; perform the edge detection of FIG. 7 to acquire multiple first target pixels; and then interpolate gaps between such first target pixels with a straight line. This makes it possible to smoothly correct the picture while allowing the edge data to exhibit a set of continuous values.

Alternatively, the smooth edge detection is attainable by causing the edge detection processing to be done with the interval of adjacent first target pixels DA rendered fine at locations offering larger variations in edge position coordinate value. Especially for the portions in the vicinity of the page bundling seam line of the document, the edge of the document image must be an arc line with an increased curvature, the interval between neighboring ones of the first target pixels DA is preferably rendered much finer. It thus becomes possible, even upon interpolation of such first target pixels DA by certain straight line, to obtain edge data indicative of a curve with maximized similarity with the real edge.

Figure 8:
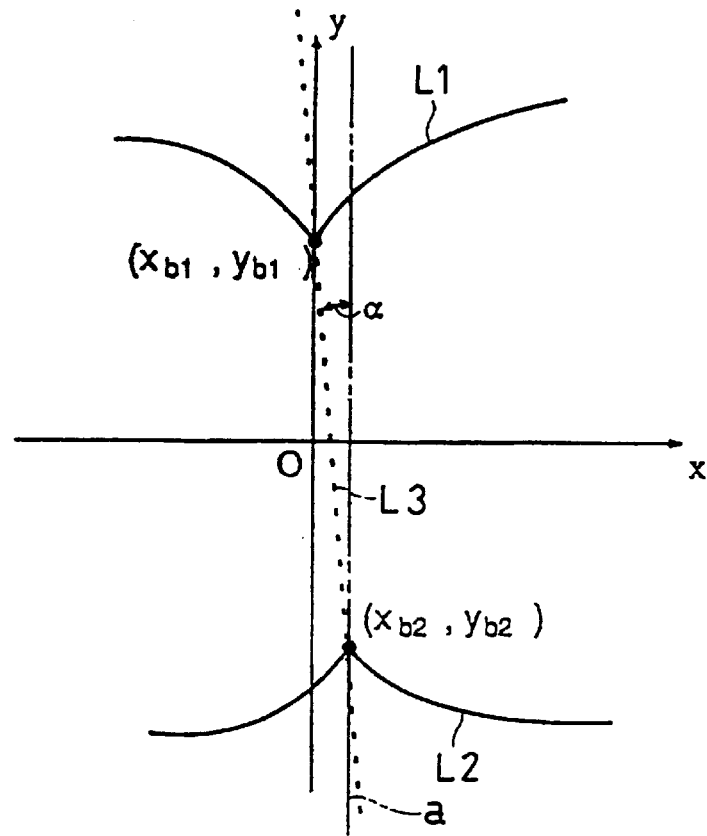
FIG. 8 is a diagram showing upper and lower position coordinate point arrays in the vicinity of a document seam line, which are from edge data indicative of a detected edge by an edge detection section 10 in a picture inputted by the picture input device 9, for explanation of skew detection.

FIG. 8 is a schematic diagram showing the upper and lower position coordinate point arrays in the vicinity of the page bundling seam line as included in the edge data outputted from the edge detection section 10. A curve L1 designates the upper edge position coordinate point array in the vicinity of the book seam line. A curve L2 is the lower edge position coordinate point array in the vicinity of the book seam line. Irrespective of which one of the picture input devices 9a, 9b is employed, it may be true that the portion in the vicinity of the seam line of a document is imaged such that the portion is reduced in size as compared to its surrounding portions. Hence, a straight line L3 penetrating the minimal point of the curve L1 and the maximal point of the curve L2 is determinable as a reference line which represents the position of the book-bundling seam line.

Next, an operation of the skew detection section 11 will be explained. The skew detection section 11 first searches for the edge data from the edge detection section 10 to specify the minimal point's position coordinates $(x_{b1}, y_{b1})$ and maximal point's position coordinates $(x_{b2}, y_{b2})$ as specific position coordinates indicative of the opposite ends of the page bundling seam line of the document. Then, calculate a document skew angle a based on such position coordinates $(x_{b1}, y_{b1})$ and $(x_{b2}, y_{b2})$, using Equation (1). The skew angle a refers to a specific angle as defined between a reference line representative of the seam line and the y-coordinate axis of the orthogonal coordinate system used.

$$\alpha = \tan^{-1} \frac{x_{b2} - x_{b1}}{y_{b1} - y_{b2}} \qquad (1)$$

Next, an operation of the rotation correction section 12 will be explained. The rotation correction section 12 rotatively converts the entire picture by using the skew angle a detected by the skew detection section 11. During such rotation correction the position coordinates (x, y) of respective characteristic points of all the pixels within the picture are individually subjected to rotation conversion using the following equation (2) of rotation conversion below. In Equation (2), the term (x', y') represents the characteristic position coordinates of pixels thus converted. While the illustrative embodiment is arranged to directly perform such skew correction with respect to the origin, it is modifiable to do this after execution of coordinate conversion.

$$\begin{pmatrix} x' \\ y' \end{pmatrix} = \begin{pmatrix} \cos(-\alpha) & -\sin(-\alpha) \\ \sin(-\alpha) & \cos(-\alpha) \end{pmatrix} \begin{pmatrix} x \\ y \end{pmatrix} \qquad (2)$$

After completion of the rotation conversion at the rotation correction section 12, the edge detection section 10 again detects an edge in such rotation-converted picture as output from the rotation correction section 12, by use of the edge detection scheme as described previously in connection with FIGS. 6 and 7, thereby outputting the resultant edge data.

Figure 9:
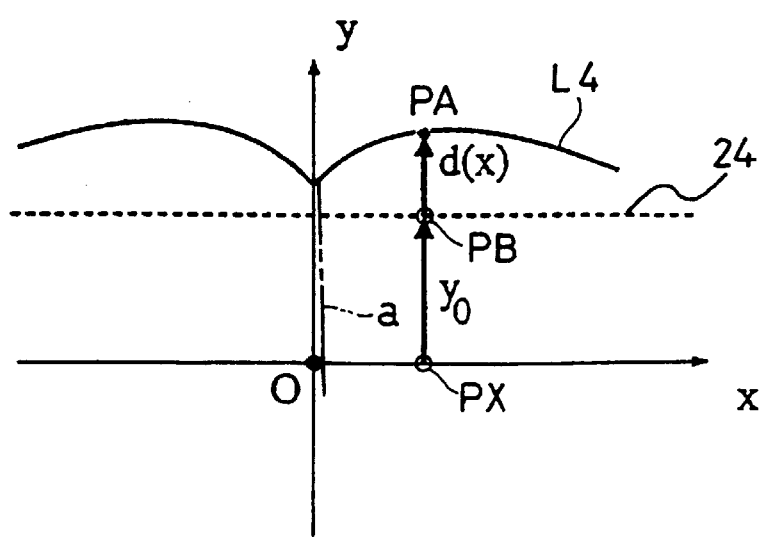
FIG. 9 is a diagram for explanation of magnification calculation by showing an upper position coordinate array in the vicinity of the document seam line, which array is from edge data indicative of an edge detected by the edge detection portion 10 within a picture as input from the picture input device 9.

FIG. 9 is a schematic diagram showing by a curve L4 the upper position coordinate point array in the edge data representative of an edge as detected from the rotation-converted picture. This curve L4 designates the position coordinate point array of an upper one of edges detected. In the rotation-corrected picture the reference line a is parallel to the y-coordinate axis. In this way, any inclination of the document image 21 may be corrected by the rotation conversion.

Next, an operation of the magnification calculation section 13 will be explained. Any picture portion which is to be focused at a point PB on the base line 24 when the document is identical in height to the surface of document table 3, is focused at a specific point greater in y-coordinate value than the point PB in conformity with its exact height from document table 3. In light of this, the magnification calculation section 13 calculates the magnification r(x) in the y-coordinate axis direction along a apparent axis line that is in parallel to the y-coordinate axis and extends to pass through both a point PA on the upper edge and point Px on the x-coordinate axis, by using the following Equation (3):

$$r(x) = \frac{y_0 + d(x)}{y_0} \qquad (3)$$

In the case where the picture is obtained using a document imaging device of the type in which a lens and an imaging device simultaneously perform scanning in the x-direction to image a document, such as a flat-bed scanner shown in FIG. 4 or the like, magnification nor reduction of the image is occurred in the X-direction due to the parallel projection of the image in the X-direction. In contrast, in the case where the picture is obtained using a document imaging device of the type in which only the imaging device perform scanning while the lens being fixed, the picture is magnified/reduced also in the x-direction because the document is point-symmetrically projected. In this situation, calculating method for the magnification s(x) in the x-direction is similar to that for the y-directional magnification r(x), the method including the steps of setting a base line with respect to the x-direction, calculating the distance from the y-coordinate to the base line and a displacement from the base line to an edge, and substituting resultant distance and displacement into Equation (3).

Figure 10:
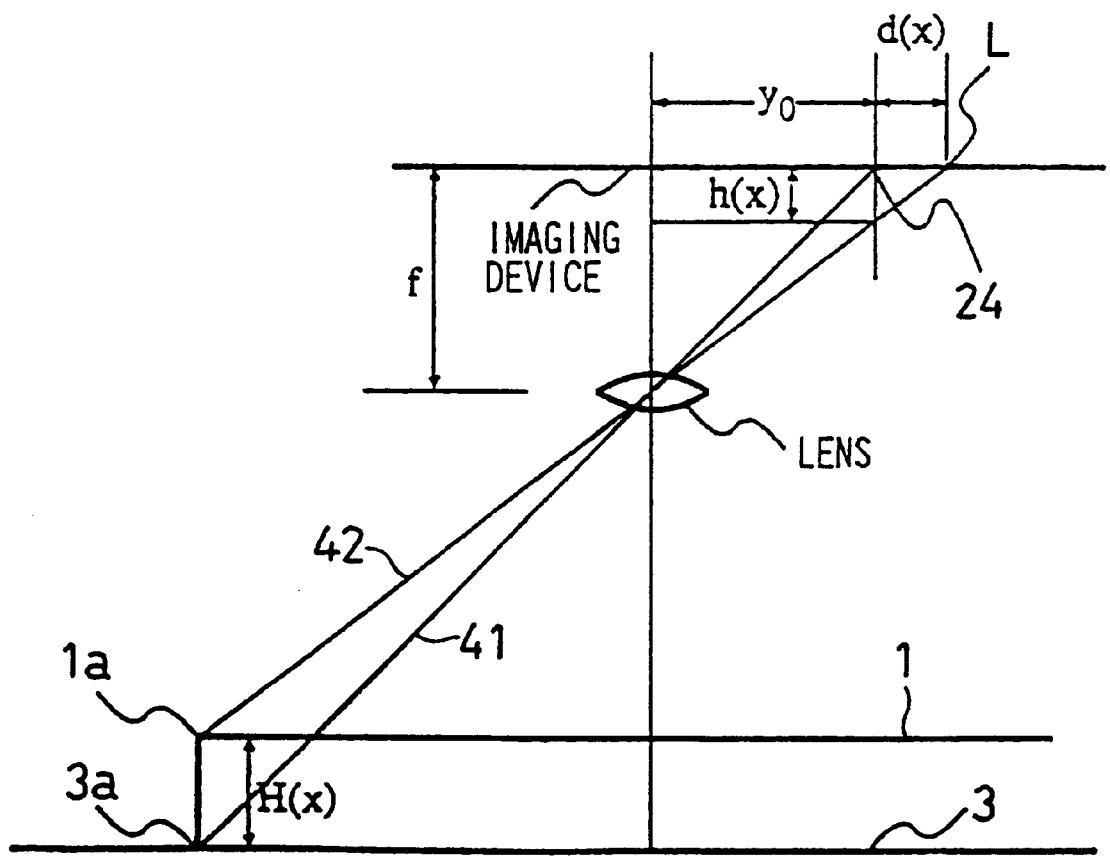
FIG. 10 is a diagram for explanation of a relation of the distance between a document and a picture imaging section versus an imaging position.

An explanation will now be given of an operation of the height calculation section 14. FIG. 10 is a diagram showing the relation between an edge L, the base line 24, and the document height H(x) when looked at from the x-direction of a document in the picture input device 9a of FIG. 2. As can be seen from this diagram, the three-parameter relation on the imaging device is similar to that in the picture.

Now a apparent line right beneath an edge 1a of the document 1 is defined as a base line 3a of the document table 3. Assuming that light from the base line 3a is focused onto the imaging plane of the imaging device, such light travels along a path 41, passes through the lens on the way, and is then focused on the imaging plane. A position to which the light is to be focused is identical to the position of the base line 24. The document edge 1a is at a location of height H(x) from the base line 3a. Light from the document edge 1a travels along a path 42, and is then focus on the imaging plane apart from the base line 24 by displacement d(x). This position corresponds to the edge L in the picture.

The apparent height h(x) of the document on the imaging device is determinable by Equation (4) using a distance f between the lens and imaging device, distance $y_0$, and displacement d(x). Virtual height h(x) is the distance to path 42 from the base line 24 of the image. Additionally, where the image is captured by the picture input device 9b of FIG. 4, the apparent height h(x) may be determined by Equation (4) with displacement d(x) being set at a negative value.

$$h(x) = \frac{d(x)f}{y_0 + d(x)} \quad (4)$$

Figures 11A, 11B, 11C:
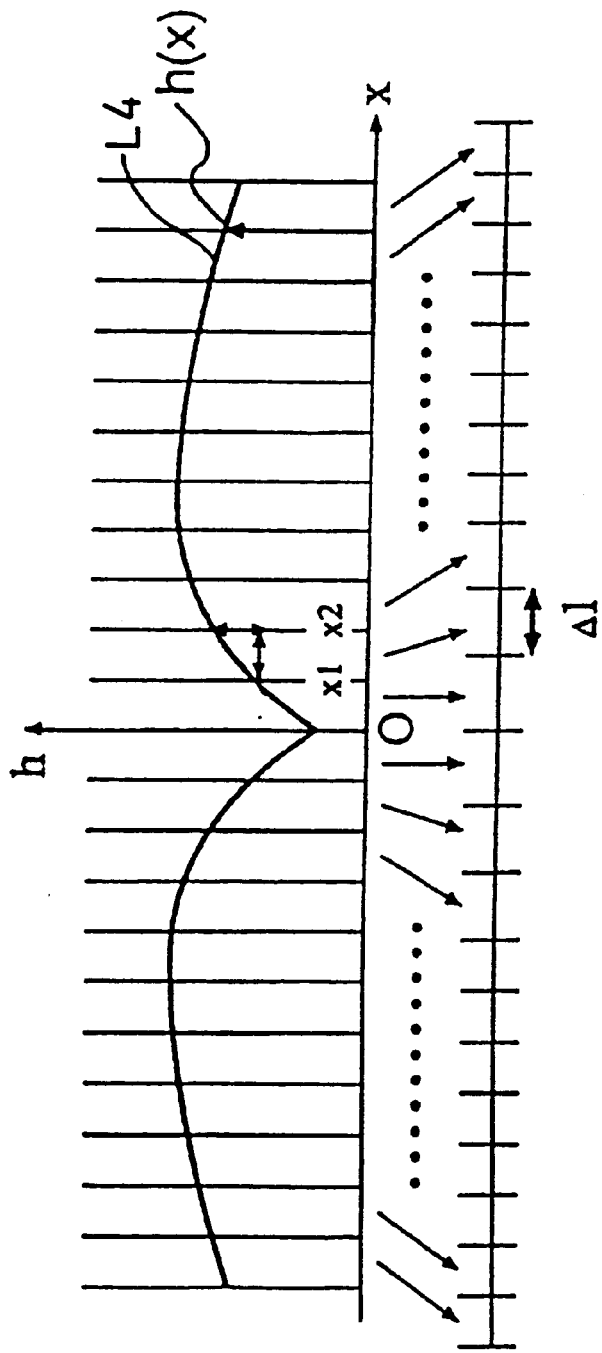
FIG. 11A is a diagram showing a curve L4 representative of an upper position coordinate array in the vicinity of the document seam line which array is from edge data indicative of an edge detected by the edge detection section 10 from a picture as input by the picture input device 9, by arranging the curve L4 distanced from an X-coordinate axis by an apparent height h(x).
FIG. 11B is an enlarged diagram of a segment between certain x-coordinates x1 and x2 in the curve L4 of FIG. 11A.
FIG. 11C is a diagram showing a relation of x-coordinates of a picture prior to distortion correction versus y-coordinates of a distortion corrected picture

An operation of the distortion correction section 15 will now be described in conjunction with FIGS. 11A to 11C. FIG. 11A shows a curve L4 representative of an array of upper continuous position coordinate points in the edge data indicative of a detected edge, which curve L4 is distanced from the x-coordinate axis by apparent height h(x). Curve L4 is equivalent to the curve as discussed previously in connection with FIG. 9, which offers maximized similarity with the cross-section profile of the document 1. FIG. 11B enlargedly depicts part of the curve L4 of FIG. 11A which covers a range from x-coordinates x1 to x2. FIG. 11C shows a correlation of the x-coordinates of a before-correction picture and those of an after-correction picture.

The distortion correction section 15 is responsive to receipt of the apparent height h(x) as fed from the height calculation section 14, for subdividing the picture into multiple blocks being aligned in the x-direction and each having a length Δx. In FIG. 11A, the vertical lines parallel to the y-coordinate axis represents both ends of each block. This length Δx is definable appropriately, for example. If length Δx is sufficiently less in value then an edge La within each block is proximately regardable as a straight line. An apparent length ΔL of the document image equals to the length of the edge La so that the length ΔL may be approximated depending upon the block length Δx and an apparent height difference Δh of edge L, as given by Equation (5). Representing the x-coordinates of both ends of the block as xa and xb, the difference Δh is equivalent to a difference between an apparent height h(xa) of the document image at the x-coordinate xa and an apparent height h(xb) of the document image at the x-coordinate xb:

$$\Delta L = \sqrt{\Delta x^2 + \Delta h^2} \quad (5)$$

The distortion correction section 15 then enlarges the picture so that it is ΔL/Δx times larger than before with respect to each block, providing a sequence of enlarged blocks with the origin as its start point. This enables correction of x-directional distortion in the document image 21 due to the inclination of the document surface. Note that where the picture is obtained by lens-fixed imaging apparatus with a sensor movable in the x-direction, picture magnification/reduction can occur also in the X-direction due to the difference in distance between the lens and a document. With this reason, for certain block having its both ends of x-coordinates x1 and x2, by way of example, the picture is enlarged not at the ΔL/Δx ratio but at a specific magnification as given by:

$$\text{magnification} = \frac{\sqrt{\{x_1/r(x_1) - x_2/r(x_2)\}^2 + \Delta h^2}}{|x_1/r(x_1) - x_2/r(x_2)|} \quad (6)$$

The distortion correction section 15 also processes the picture so as to y-directionally reduce at a ratio equal to the inverse, 1/r(x), of the y-coordinate magnification r(x) with respect to each column of pixels, by way of example. Whereby, it is possible to correct y-directional distortion of the document image 21. With the above processing, it becomes possible to effectuate distortion correction of the document image 21; as a result, a document image of rectangular shape can be obtained.

Figure 12:
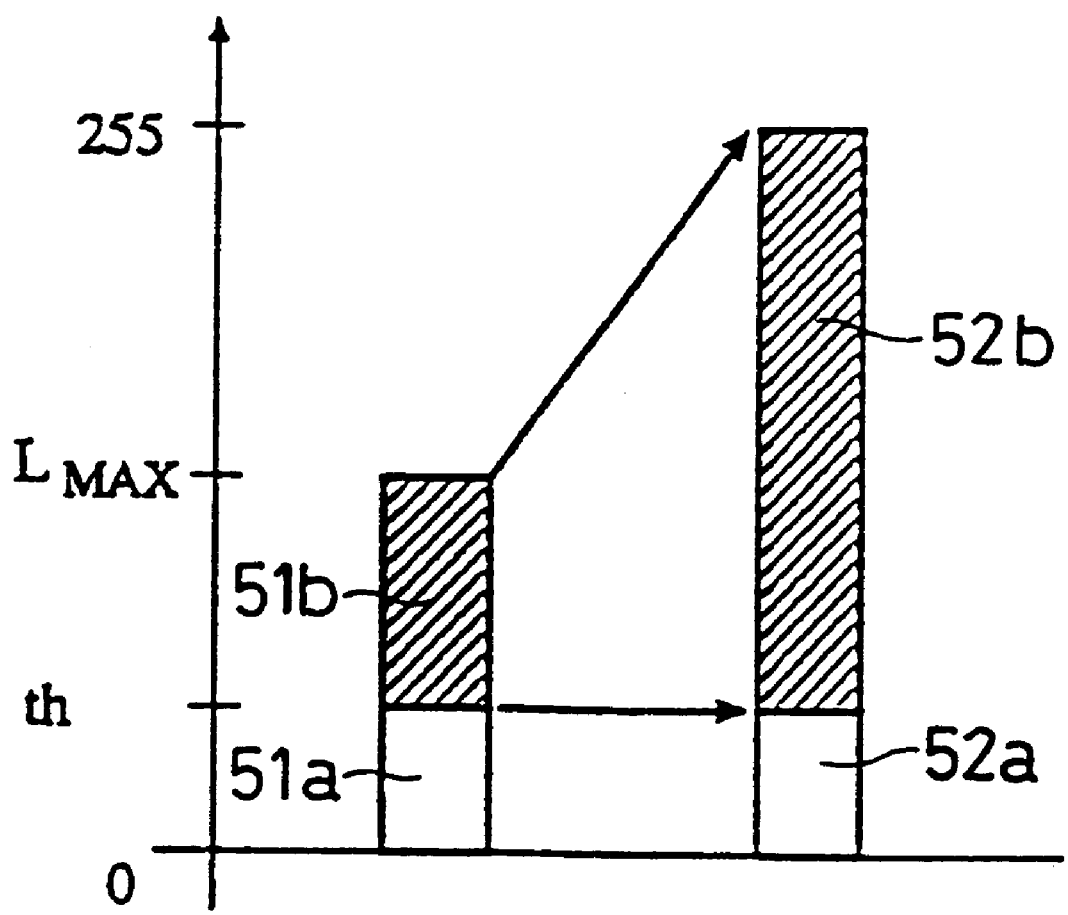
FIG. 12 is a graph showing the luminance of pixels in a certain column of the picture.

Next, an operation of the luminance correction section 16 will be explained. FIG. 12 is a graph showing the luminance of pixels at certain column of the picture, wherein bars 51a and 51b represent the luminance values of before-corrected pixels q1 and q2 in the certain column whereas bars 52a and 52b represent those of pixels q1 and q2 after correction.

The luminance correction section 16 investigates the luminance values of the pixels with respect to each column, and determines a maximum value. At this time, luminance correction section 16 employs a predetermined threshold value th to convert by Equation (7) the luminance value of each pixel greater than the value th to ensure that its maximal value equals a predetermined value while causing the variation rate of luminance between each pixel to be kept unchanged. In Equation (7), $L_{MAX}$ is a maximum luminance value at a certain column, va1 is a luminance value of before-corrected pixel, and va1' is a luminance the pixel after-correction. Here, the predetermined value is set at 255. The maximum value $L_{MAX}$ may alternatively be the average of luminance values of plural pixels of relatively higher luminance in a certain column. With such correction operation, the luminance of a pixel q1 less than threshold value th as indicated by the bar 51a is allowed to maintain at this value th as shown by bar 52a; on the contrary, the luminance of pixel q2 greater than th as indicated by bar 51b is increased up to 255 as shown by bar 52b. The correction procedure will be repeated with respect to the entire columns within the picture completing luminance correction for the entire picture. For instance, even where the luminance of the picture is decreased at the portion in the vicinity of the bundling seam line of a document, such decreased luminance can be compensated for and recover at its original value.

$$val' = (val - th)\frac{255 - th}{L_{MAX} - th} + th \quad (7)$$

In the above explanation, a monochromatic picture is assumed for a picture to be processed. The picture processing apparatus 8 is capable of correcting the distortion of document image even when the picture to be processed is a color picture. More specifically, signals representative of a color picture include three color signals each individually representing a single-colored picture in one of the three principal color components of red, green, and blue. Converting these three signals into signals representative of luminance component and signals representative of color-difference component may allow the edge detection section 10 to perform based on the signals of luminance element an edge detection processing similar to that for monochrome pictures. In this situation the distortion correction section 15 performs the distortion correction stated supra with respect to each of the three signals. A further alternative is that in the case of performing luminance correction, after applying the luminance correction to the signals representing the luminance component, the luminance correction section 16 again reproduces the three signals, which may represent red/green/blue colors respectively, based on the signals of luminance component after luminance-correction and the signals of color-difference component, causing distortion correction section 15 to carry out distortion correction with respect to each of three signals thus reproduced.

Figure 13:
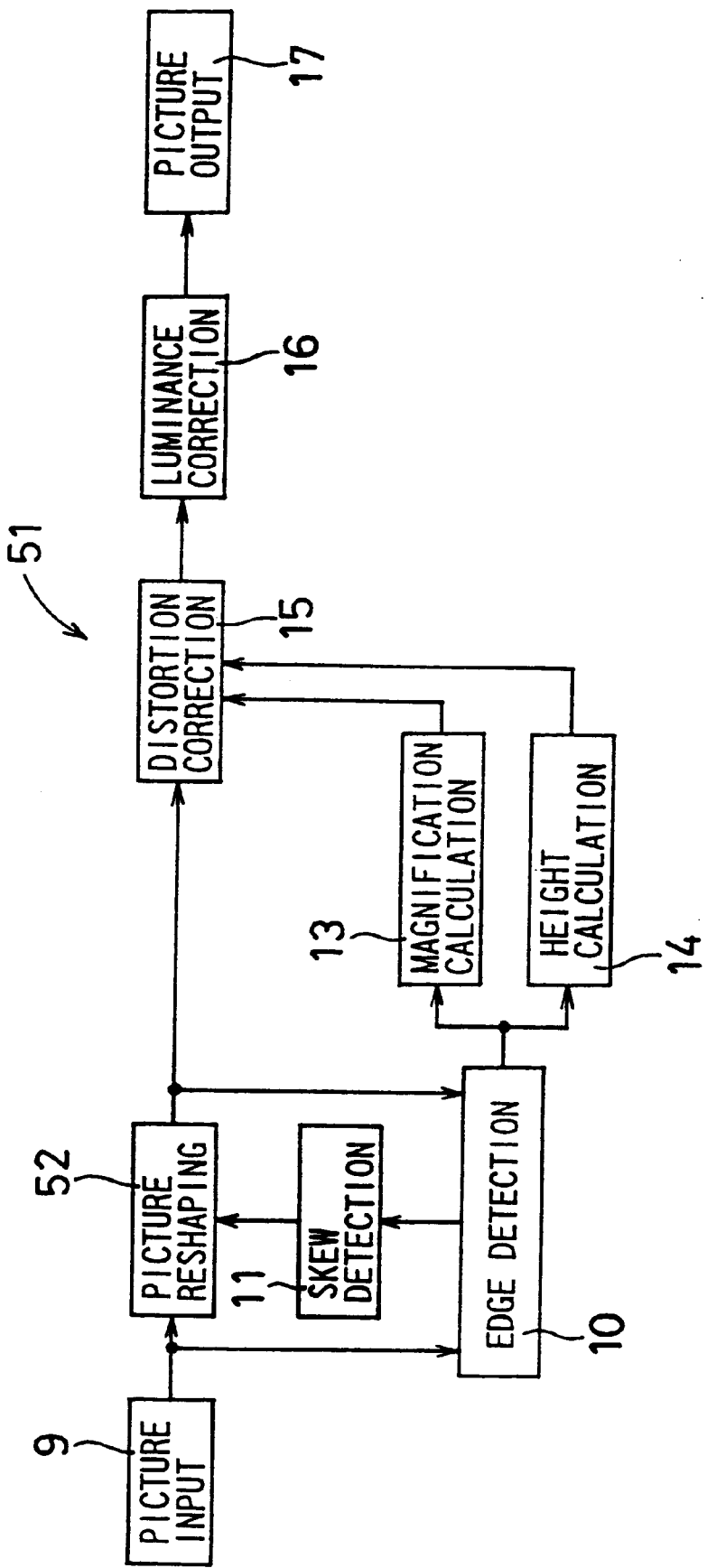
FIG. 13 is a block diagram showing an electrical configuration of a picture synthesis apparatus 51 which is a second embodiment of the invention.

FIG. 13 is a block diagram showing an electrical configuration of a picture processing apparatus 51 in accordance with a second embodiment of the invention. The picture processing apparatus 51 is similar to the picture processing apparatus 8 of the first embodiment except the rotation correction section 12 being replaced by a picture reshaping section 52. In the picture processing apparatus 51, components operating as same as those of the picture processing apparatus 8 are designated by the same reference numerals and explanations therefor omitted here for the purposes of elimination of redundancy. The picture reshaping section 52 reshapes a part of the picture based on the reference line representative of the page bundling seam line of a document which is detected by the skew detection section 11. The difference between the picture processing apparatus 8 of the first embodiment and the picture processing apparatus 51 of the second embodiment is that the former allows the rotation correction section 12 to effectuate correction by causing a picture to rotate whereas the latter forces the picture reshaping section 52 to do the same by letting such picture to be reshaped at a certain portion thereof including the seam line of the document.

Figure 14A:
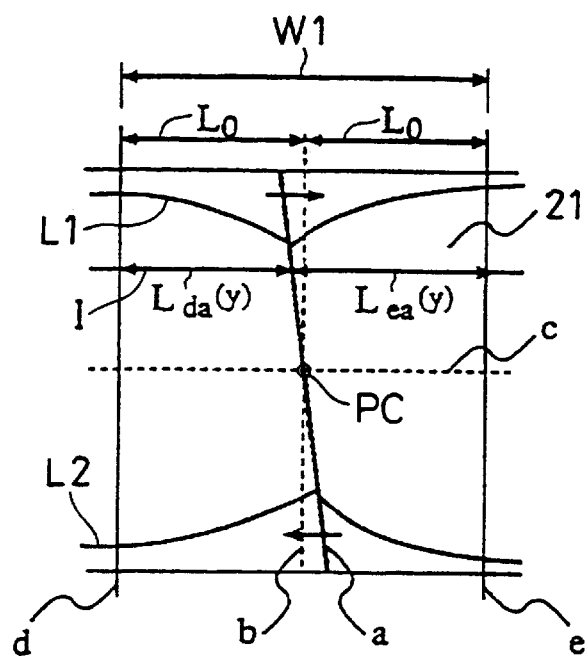
FIG. 14A is a diagram showing upper and lower position coordinate arrays in the vicinity of the document seam line which are from edge data indicative of an edge detected by the edge detection section 10 from a picture as inputted by the picture input device 9.

An operation of the picture reshaping section 52 will be described in conjunction with one exemplary picture as shown in FIG. 14A. FIG. 14A illustrates the upper and lower position coordinate point arrays placed in the vicinity of the page bundling seam line of a document, which arrays are from edge data outputted from the edge detection section 10. Curves L1 and L2 are identical to those described in FIG. 8. A predetermined region to be reshaped by the picture reshaping section 52 in the picture is definable by an x-directional range W1 and a y-directional range covering from the upper to the lower edge of the document image. The range W1 is determinable in a way including the steps of specifying the minimal point of the upper edge and the maximal point of the lower edge as detected by the skew detection section 11, extracting a midway point between them as a center point PC, determining a straight line e that is parallel to the y-coordinate axis and spaced apart by a distance $L_0$ from the center point PC in an x-coordinate incremental direction, determining another straight line d parallel to the y-coordinate axis far from point PC by distance $L_0$ in an x-coordinate decremental direction, and extracting an intermediate zone laid between the lines e and d. A further straight line c is also defined which is parallel to the x-coordinate axis and penetrates the point PC. The picture reshaping section 52 reshapes the predetermined region in the picture in a way such that a straight line a including the reference line and representative of the book's bundling seam line is at right angles to the x-coordinate axis like a straight line b parallel to the y-coordinate axis and penetrating point PC.

More practically, with respect to each imaginary axis line which is parallel to the x-coordinate axis, each coordinates in the picture or coordinates of a characteristic point of a pixel is magnified by $L_0/L_{da}(y)$ for the portions between the line d and the line a; and each coordinates in the picture is magnified by $L_0/L_{ea}(y)$ for the portions between the line e and the line a. The value $L_0/L_{da}(y)$ refers to the distance $L_0$ divided by distance $L_{da}(y)$ between lines d and a on the imaginary axis line h whereas $L_0/L_{ea}(y)$ is the distance $L_0$ divided by distance $L_{ea}(y)$ between lines e and a on the imaginary axis line h.

Figure 14B:
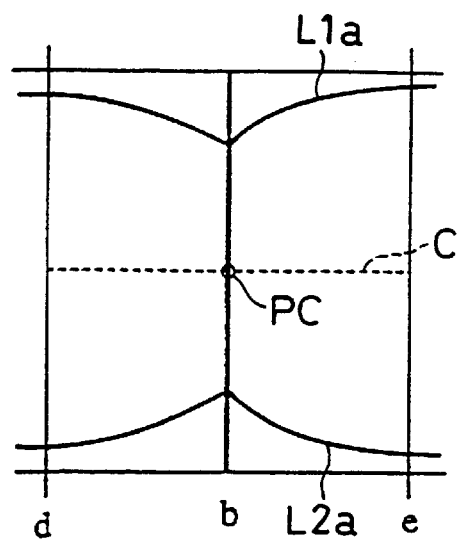
FIG. 14B is a diagram showing upper and lower position coordinate arrays in the vicinity of the document seam line which are from edge data indicative of an edge of a picture as converted by a picture conversion section 52.

With such process, the picture is reshaped so that the line a is identical to the line b as shown in FIG. 14B. The x-directional width of the region employed in reshaping of the picture at the picture reshaping section 52, i.e. distance $L_0$, may be appropriate constant value. The distance $L_0$ may alternatively be variable depending upon the skew angle detected at the skew detection section 11. Preferably, to obtain more natural picture, the distance $L_0$ is designed to increase with an increase in skew angle causing the range W1 to increase accordingly.

One significant advantage of the picture processing apparatus 51 of this embodiment over the picture processing apparatus 8 of the first embodiment lies in more successful correctability of distortion-rich areas in the vicinity of the page bundling seam line in the picture, while accompanying a slight penalty of a reduction in accuracy of image distortion correction. Further, the processing amount can be more reduced than the picture processing apparatus 8 because the area of the predetermined region is less than that of the entire picture. It is thus possible to speed up the image correction processing as a whole.

FIG. 15 is a block diagram showing an electrical configuration of a picture processing apparatus 61 in accordance with a third embodiment of the invention. The picture processing apparatus 61 is similar to the picture processing apparatus 8 of the first embodiment except the rotation correction section 12 being eliminated, and the edge detection section 10, the magnification calculation section 13, height calculation section 14 and distortion correction section 15 being replaced with an edge detection section 10a, magnification calculation section 13a, height calculation section 14a, and distortion corrector 62. Parts or components of the picture processing apparatus 61 which are the same in operation as those of the picture processing apparatus 8 are designated by the same reference characters, and any detailed explanations thereof will be omitted.

The edge detection section 10a detects an edge for once from is the picture inputted from the picture input device 9. The skew detection section 11 detects a reference line representing seam line of the document and a skew on the basis of the edge detected by the edge detection section 10a. The magnification calculation section 13a and the height calculation section 14a, when they are compared with the magnification calculation section 13 and the height calculation section 14 of the picture processing apparatus 8 of the first embodiment, are different in that while the latter is designed to perform calculating operation based on the edge as detected from rotation-converted picture, the former does the same based on the edge detected from a picture inputted by the picture input device 9, but are identical in other aspects. A distortion correction section 62 reshapes the picture inputted from the picture input device 9 on the basis or the skew detected by the skew detection section 11, the magnification calculated by the magnification calculation section 13, and a document height as calculated by height calculation section 14, to correct the distortion of the entire picture. A luminance correction section 63 corrects the luminance of the picture whose distortion has been corrected by the distortion correction section 62, on the basis of the skew detected by the skew detection section 11.

Figure 16A:
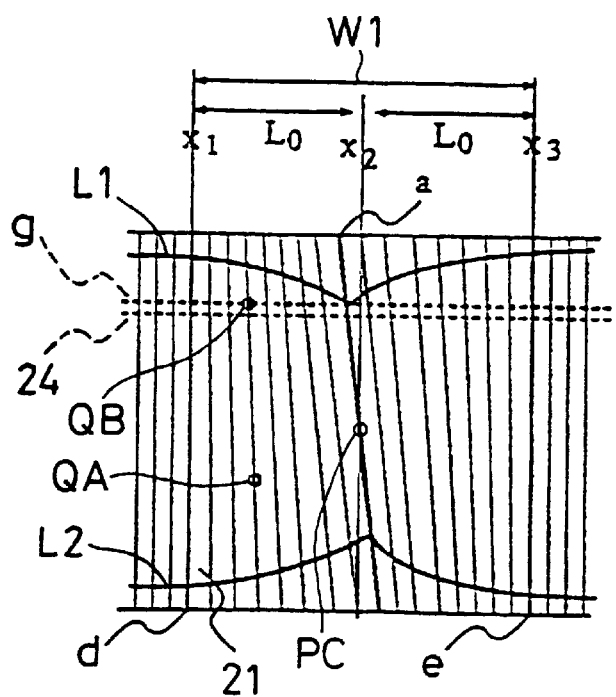
FIG. 16A is a diagram showing upper and lower position coordinate arrays in the vicinity of the document seam line which are from edge data indicative of an edge detected by the edge detection section 10 from a picture as inputted by the picture input device 9.

An operation of the distortion correction section 62 will be described in conjunction with one exemplary picture shown in FIG. 16A. FIG. 16A depicts the upper and lower position coordinate point arrays in the vicinity of the page bundling seam line of a document, which are from the edge data outputted from the edge detection section 10. Curves L1, L2 are equivalent to those described in FIG. 8. The predetermined region, range W1, distance $L_0$ and lines a, d, e are identical to those of FIG. 14A discussed supra. The distortion correction section 62 reshapes the picture at the portion located within the range W1 in such a manner that the skew angle between the lines d and a and the skew between the lines a and c come gradually come closer in the y-direction to finally coincide.

More specifically, the entire picture is divided into a plurality of segments in such a manner that a plurality of segments included in the predetermined region have trapezoidal shape and show the inclinations varying in a step-like manner; the segments other than those included in the predetermined region of the picture are rectangular. The distance $L_0$ which is a half width of the predetermined region in the x-direction may be a constant value. Alternatively the distance $L_0$ may be rendered variable in conformity with the skew angles as detected by the skew detection section 11. Preferably, for attainment of more natural picture, the distance $L_0$ is increased with an increase in skew angle causing the range W1 to likewise increase.

Subsequently, the distortion correction section 62 reshapes the picture with respect to each segment within the predetermined region based on the magnification and document height. For the reshaping in the x-direction, an imaginary axis line g which extends through the minimal point of the upper edge and is parallel to the x-coordinate axis is determined. Coordinates on the imaginary axis line g are such that the y-coordinate value thereof is identical to that of the minimal point. Then, suppose as a displacement d(x) a distance between the base line 24 and the imaginary axis line g within a segment to be processed is supposed as a displacement d(x). The x-coordinates of intersections between the imaginary axis line g and boundary lines of such segment are supposed as x1 and x2, and the distance between x1 and x2 as a segment width Δx. Next, an x-directional magnification is calculated in a way similar to that in the distortion correction section 15 of the first embodiment. And the segment is magnified at the thus calculated magnification, thus enabling extension of the document inclination.

Figure 16B:
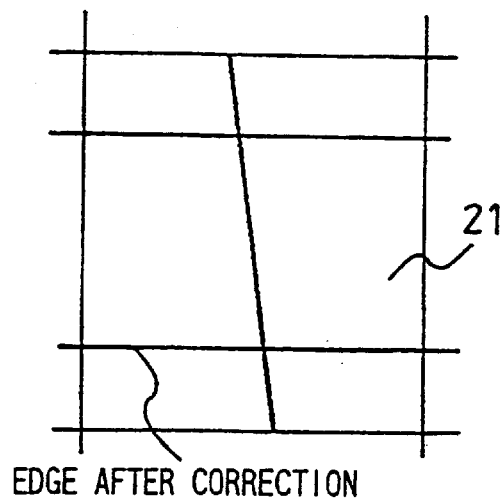
FIG. 16B is a diagram showing upper and lower position coordinate arrays in the vicinity of the document seam line which are from edge data representative of an edge of a picture as converted by a distortion correction section 62.

Regarding the y-directional picture reshaping, initially it is assumed that the height from the document surface to the document at a point QA at a given location on the boundary of the segment within the document image 21 is identical to that at intersection QB between such boundary and apparent axis line g. Then, the x-coordinate value xB of the intersection QB is substituted into Equation (3) presented supra to determine a magnification r(xB) in the y-coordinate direction. Next, the segment to be processed is magnified by 1/r(xB) times in a direction parallel to a straight line passing through the points QA and QB. In this way, the correction of distortion in the picture can be accomplished by reshaping the picture while calculating both the x-directional magnification and the inverse of y-directional magnification r(xB) for each trapezoidal segment. With this distortion correction, resultant picture has edges of almost rectangular shape as shown in FIG. 16B.

An operation of the luminance correction section 63 will be explained. The luminance correction section 63 is similar to the luminance correction section 16 of the picture processing apparatus 8 of the first embodiment expect that the column-dependent processing is executed with respect to a series of pixels as a unit, which pixels are aligned within the segment in a specific direction as inclined by a skew angle from the y-direction that is, in the direction of picture correction at the distortion correction section 62. More specifically, investigate luminance values of such pixels to extract therefrom maximal and minimal values $L_{MAX}$, $L_{MIN}$, which are for use in performing later luminance correction. The reason for this is as follows. The series of pixels is predictable as those representative of an elongate band-like region in the y-direction on the original document. Also presumably, luminance variations due to the curvature of the document remain uniform within the band-like region. Accordingly, assuming the series of pixels indicative of this band-like region as an object under processing, use of the foregoing scheme renders luminance correction attainable while offering substantially the same luminance distribution as that of its original band-like region, since these pixels vary in luminance at a specific rate that is identical to intensity variations due to document surface curvature.

With the picture processing apparatus 61 of this embodiment, corrected document may be more natural visibility as compared to the picture processing apparatus 51 of the second embodiment. Furthermore, when compared to the picture processing apparatus 51 of the first embodiment, since the area to be subjected to the picture distortion correction is less, the processing amount can be reduced. Accordingly, it is possible to improve the processing rate for the picture processing.

The foregoing picture processing apparatuses 8, 51, 61 of the first to third embodiments may be realized by causing a computer to let a software for effectuating the image processing operation be stored in a readable storage medium and by installing this software into an image-input/storage executable computer. This storage medium may be a CD-ROM or a floppy disk.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A picture processing apparatus comprising:

first edge detection means for detecting an edge of a document image from a picture obtained by imaging the document;

skew detection means for detecting a skew of the document from the edge detected by the first edge detection means;

rotation correction means for rotating the picture on the basis of the skew;

second edge detection means for detecting an edge of the document image from the picture rotated by the rotation correction means;

magnification calculation means for calculating a magnification of the picture from the edge detected by the second edge detection means;

height calculation means for calculating a height of the document from a reference plane on the basis of the edge detected by the second edge detection means; and distortion correction means for correcting a distortion of the picture through magnification/reduction of the picture rotated by the rotation correction means on the basis of the magnification and the height of the document.

2. A picture processing apparatus comprising:

first edge detection means for detecting an edge of a document image from a picture obtained by imaging the document;

skew detection means for detecting a skew of the document from the edge detected by the first edge detection means;

picture reshaping means for reshaping a predetermined region of the picture on the basis of the skew;

second edge detection means for detecting an edge of the document image from the picture reshaped by the picture reshaping means;

magnification calculation means for calculating a magnification of the picture from the edge detected by the second edge detection means;

height calculation means for calculating a height of the document from a reference plane on the basis of the edge detected by the second edge detection means; and distortion correction means for correcting a distortion of the picture through a magnification/reduction of the picture reshaped by the picture reshaping means on the basis of the magnification and the height of the document.

3. A picture processing apparatus comprising:

edge detection means for detecting an edge of a document image from a picture obtained by imaging the document;

skew detection means for detecting a skew of the document from the edge;

magnification calculation means for calculating a magnification of the picture from the edge;

height calculation means for calculating a height of the document from a reference plane on the basis of the edge;

distortion correction means for correcting a distortion of the picture by subdividing a predetermined region of the picture into a plurality of trapezoidal segments on the basis of the skew to individually perform magnification/reduction for each trapezoidal segment on the basis of the skew, magnification, and height of the document.

4. The picture processing apparatus of claim 1, further comprising luminance correction means for correcting a luminance of the picture whose distortion has been corrected by the distortion correction means, in such a manner that the higher the luminance the closer the luminance comes to a predetermined upper limit.

5. The picture processing apparatus of claim 3, further comprising luminance correction means for correcting a luminance of each trapezoidal segment of the picture whose distortion has been corrected by the distortion correction means, in such a manner that the higher the luminance the closer the luminance comes to a predetermined upper limit.

6. The picture processing apparatus of claim 1, wherein the edge detection means subdivides the picture into a plurality of detection blocks, to detect an edge position of each detection block at a predetermined location, to connect lines each defined by two of the plurality of detected edge positions, thereby designating an edge.

7. The picture processing apparatus of claim 6, wherein the edge detection means reduces the detection block in response to increases in variation amount of the edge within the picture.

8. The picture processing apparatus of claim 2, wherein the picture reshaping means enlarges the predetermined region as the skew becomes larger.

9. The picture processing apparatus of claim 3, wherein the distortion correction means enlarges the predetermined region as the skew becomes larger.

10. The picture processing apparatus of claim 1, wherein the skew detection means determines a maximal point and a minimal point from among the edges, and detects as a skew an angle between a straight line penetrating such maximal and minimal points and a predetermined reference axis line in the picture.

* * * * *